April 1, 1958 H. L. FOOTE 2,829,309
PULSE REGISTER
Filed July 27, 1956

*INVENTOR.*
HOWARD L. FOOTE
*BY* Francis E Blake
ATTORNEY 2,829,309
Patented Apr. 1, 1958

2,829,309

PULSE REGISTER

Howard L. Foote, Fairport, N. Y., assignor to General Dynamics Corporation, Rochester, N. Y., a corporation of Delaware Application July 27, 1956, Serial No. 600,429

3 Claims. (Cl. 313—84.5)

The present invention relates to voltage pulse register circuits, and more particularly to the so-called voltage pulse counting chains utilizing a plurality of serially connected register circuits.

Pulse counting chains are well known and are usually provided with a plurality of controlled tube devices of either the grid-controlled hard vacuum tube or the grid-controlled thyratron tube types so connected in a circuit as to serially record and register occurrences of pulses by the relative operated conditions of the tubes. Grid-controlled vacuum tubes or grid-controlled gas tubes are comparatively expensive and, therefore, a pulse counting chain employing such tubes and having a sufficient number of tubes to count and register a high number of voltage pulses is relatively expensive.

It is an object of this invention to provide an inexpensive voltage pulse counting chain arranged to use inexpensive diode type gas tubes as the gating and registering elements in place of the more expensive grid-controlled tube devices mentioned above.

Yet another object of this invention is to provide an improved voltage pulse register circuit having a simplified circuit arranged to use a minimum of components including simple and inexpensive gas diode tubes.

In practicing the invention, a first gas tube diode is arranged to function as a register tube and indicate the registration of a voltage pulse by a sustained conductive condition. A second gas tube diode is employed as a gate tube to enable the application of the voltage pulse to be registered to the associated register tube. By arranging a plurality of the aforementioned first and second gas tubes in alternate succession as a plurality of counting stages with suitable coupling connections, as will be described in detail, successive voltage pulses may be registered as indicated by sustained conductive conditions of successive register tubes. Inasmuch as the gas tube diodes used for both the gating and registering functions are very inexpensive, a relatively large member of stages of each, comprising a gate diode and associated register diode, may be serially connected in tandem to provide a high counting capacity for the counting chain.

Figure 1:
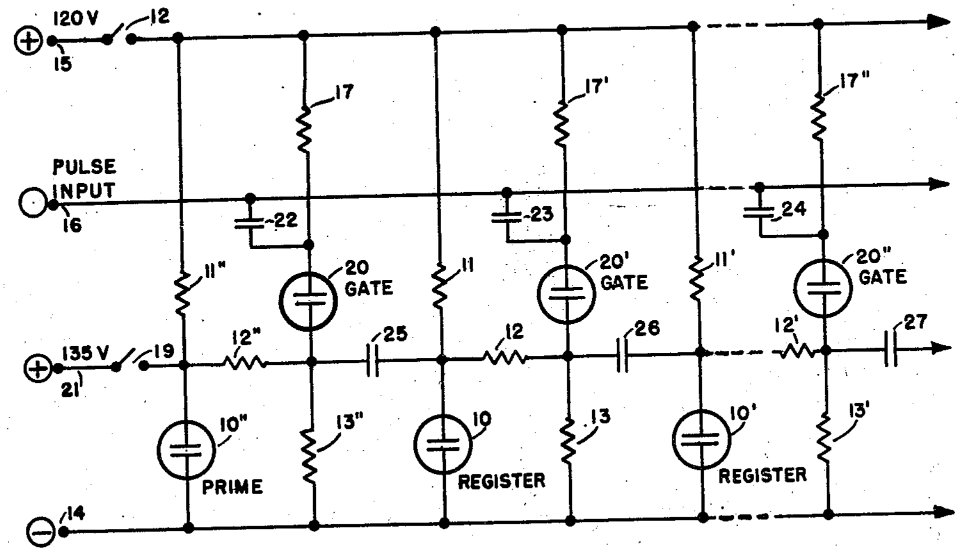
Figure 2:
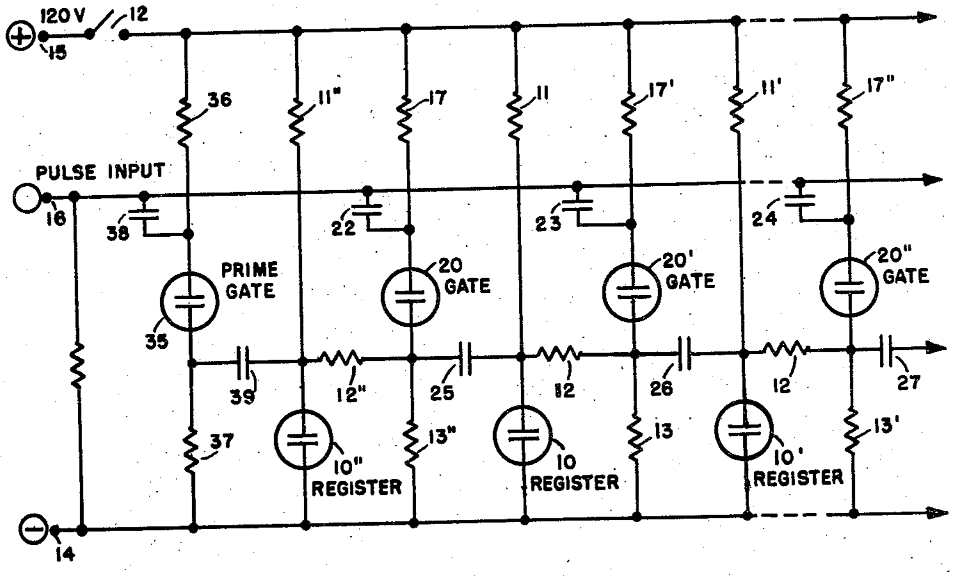

Further objects and advantages of the invention will become apparent with reference to the following specification and drawing in which, Fig. 1 is a circuit diagram of one embodiment of the invention, and Fig. 2 is a circuit diagram of another embodiment of the invention.

Referring to Fig. 1 of the drawing, a counting chain, according to the invention, will be described. The counting chain may be comprised of a plurality of register stages, each stage including a diode gas tube register device 10 or 10′ and a diode gas tube gate device 20 or 20′. Each of the diode gas tube register devices 10 or 10′ is of a type which has operating characteristics such that the tube will fire to become conductive upon an application of a given minimum voltage across its diode electrodes and will remain conductive in the presence of an applied voltage less than the voltage to be applied to initiate conduction. For example, a gas tube, commercially available as type NE–96, could be used as the register element 10 or 10′, and such tube has a firing voltage characteristic of about one hundred and thirty-five volts, plus or minus fifteen volts, and a sustaining voltage characteristic of about seventy-five volts, plus or minus ten volts.

Each gas tube diode register element 10 or 10′ is connected in circuit with a source of direct current having a potential of about one hundred and twenty volts in series with a voltage dropping resistor 11 or 11′ and a control switch 12. Also connected in shunt with each diode gas tube register 10 or 10′ are resistors 12, 13 or 12′, 13′. It will be noted that the voltage of the source provided at terminals 14 and 15 to be connected when switch 12 is closed for application across the diode electrodes of register tubes 10 and 10′ is not greater than one hundred and twenty volts amplitude, which is less than the firing voltage amplitude characteristic for each of the register tubes, such as 10 and 10′. Therefore, none of the register tubes 10 or 10′ will become conductive when switch 12 is initially closed.

Voltage pulses to be registered and counted are applied across terminals 16 and 14 and it will be assumed that these voltage pulses to be counted and registered have sufficient momentary voltage amplitude of the requisite polarity to accomplish the desired results as will be described in detail hereinafter. Each gas tube diode gate element 20, 20′ or 20″ is also connected in circuit with the direct current voltage source at terminals 14 and 15 in series with voltage dropping resistors 17, 17′ or 17″ and the associated resistors 13, 13′ and 13″. It will be noted that each of the aforementioned resistors 13 or 13′ is part of the shunt circuit for the associated register diode 10 or 10′, respectively. However, resistor 13″ is part of a shunt circuit including serially connected resistor 12″, which is associated with a first register diode 10″ which will hereinafter be referred to as a prime tube since its function is to initially prime the succeeding circuits for registration of the first and succeeding voltage pulses. Each of the gate tubes 20, 20′ or 20″ is preferably of the type having similar firing and sustaining voltage characteristics and, for example, may be of the type commercially available under the designation NE–2, having firing and sustaining voltage amplitude characteristics averaging about seventy-five volts. The parameters of the circuit affecting each gate tube 20, 20′ or 20″ as determined by the relative values of the associated resistors, such as 11, 12, 13 and 17′, are such that the applied voltage across each gate tube is normally less than the firing voltage characteristic of the gate tube so that none of the gate tubes 20, 20′ or 20″ are normally fired in the absence of voltage pulses to be registered and counted.

The aforementioned prime register tube 10″ is also connected in circuit with the direct current voltage source at terminals 14 and 15 in series with the resistor 11″ and the switch 12. Again the prime diode 10″ is of the NE–96 type whose firing voltage amplitude characteristic is greater than the supply voltage appearing across terminals 14 and 15 so that the prime tube 10″ is not normally conductive.

When it is desired to register and count one or more voltage pulses to be applied across terminals 14 and 16, switch 12 is closed to apply the voltages in the previously described manner across the prime tube 10″, the register tube, such as 10 and 10′, and the gate tubes 20, 20′ and 20″. Prime switch 19 is also closed momentarily to apply a voltage with an amplitude of at least one hundred and thirty-five volts, as appearing across terminals 14 and 21, directly across the diode electrodes of the prime tube 10″ which thereupon becomes conductive. Since the prime tube 10″ is of the type having a sustaining voltage amplitude characteristic less than its firing voltage amplitude characteristic, after tube 10″ becomes conductive upon the momentary closure of switch 19, it will remain conductive assuming that the applied voltage as connected through closed switch 12 and resistors 11″, 12″ and 13″ is greater than the sustaining voltage characteristic of tube 10″. According to the invention, the values of the aforementioned resistor 11″, 12″ and 13″ together with the amplitude of voltage supplied across terminals 14 and 15 are such that the applied voltage across the electrodes of the tube 10″ is greater than its sustaining voltage amplitude characteristic so that once fired, the prime tube will remain conductive so long as switch 12 is closed. With prime tube 10″ conductive, the voltage drop appearing across resistors 12″ and 13″ is changed so that the voltage normally applied across the electrodes of the diode gate 20 is increased by an amount which will enable tube 20 to become conductive when a first voltage pulse to be registered and counted is applied thereto through the coupling capacitor 22. However, since the register tube 10 or 10′ is not at this moment conductive, neither the gate tube 20′ or 20″ will become conductive by application of the aforementioned first voltage pulse to be registered and counted as coupled through the coupling capacitors 23 or 24. Therefore, the first voltage pulse to be registered and counted as coupled through any of the coupling capacitors 22, 23 or 24 will cause only the gate tube 20 to become conductive. Since each of the gate tubes 20, 20′ or 20″ is of the type having similar firing and sustaining amplitude voltage characteristics, these gate tubes can fire only momentarily in the presence of the pulse to be registered and counted and will not sustain conduction. Also, as previously described, only the gate tubes connected in circuit with a preceding register or prime tube 10, 10′ or 10″ that is at that time in a conductive condition will be able to become momentarily conductive in the presence of the voltage pulse to be counted.

Therefore, after the prime tube 10″ is made conductive by the closure of switch 12 and the momentary closure of switch 19, the first voltage pulse to be registered and counted will cause only the gate tube 20 to become momentarily conductive. The momentary conduction of gate tube 20 applies a pulse through coupling capacitor 25 momentarily across the diode elements of register tube 10 and assuming this momentary pulse is of sufficient amplitude and the requisite polarity, will add to the applied voltage across the register tube 10 and produce a voltage amplitude greater than the firing voltage amplitude characteristic of the register tube 10 to fire the tube. The register tube 10 will thereafter remain conductive since its sustaining voltage amplitude characteristic, which is less than its firing voltage amplitude characteristic, is also less than the applied voltage applied thereacross in series with resistor 11 and closed switch 12 to the voltage source terminals 14 and 15. With the register tube 10 fired and remaining conductive, the registration and count of the first voltage pulse is thereby indicated.

The sustained conduction through the first count and register tube 10 increased the applied voltage across the second gate tube 20′ in the manner previously described in connection with the first gate tube 20. Therefore, the application of the second voltage pulse to be counted and registered will thereafter cause both gate tubes 20 and 20′ to become momentarily conductive which will therefore momentarily connect a voltage pulse coupling capacitor 26 to the next register tube 10′, which becomes and remains conductive in the same manner as previously described in connection with register tube 10. Any number of successive stages of gate and register tubes, such as 20, 20′ and 10, 10′, may be serially connected as indicated by the dotted lines extending to the coupling capacitor 24 for gate tube 20″, for example, as may be required to serially count up to a maximum desired number of occurrences of voltage pulses.

It should be obvious that the relative values of the circuit elements, such as the resistors, capacitors and gas tube diodes, together with the chosen voltage amplitudes for the supply voltage source and the voltage pulses to be counted must be suitably correlated in order that the parameters of the circuit arrangement will provide the desired relationships for the various firing and sustaining amplitude characteristics of the gas tube diodes employed for both gate, register and prime tubes. The following table of circuit values is given for one operative form of the invention as shown by Fig. 1 of the drawing:

Gas tube diodes 10, 10′ or 10″=NE–96
Gas tube diodes 20, 20′ or 20″=NE–2
Reistors 11, 11′ and 11″=110,000 ohms
Reistors 12, 12′ and 12″=470,000 ohms
Reistors 13, 13′ and 13″=3,300,000 ohms
Resistors 17, 17′ and 17″=120,000 ohms
Capacitors 22, 23 and 24=.01 mf.
Capacitors 25, 26 and 27=.005 mf.
Voltage applied across terminals 14 and 15=120 volts D.-C.
Voltage applied across terminals 14 and 21=135 volts D.-C.
Maximum amplitude of voltage pulse to be registered=not less than 15 volts or more than 50 volts D.-C.

Referring to Fig. 2 of the drawing, a modified form of the invention is disclosed in which the prime switch 19 is not required to be momentarily closed to initiate the counting operation as previously described in connection with Fig. 1 of the drawing. In this form of the invention, each counting and registering stage is provided with the associated register and gate tubes 10, 20, 10′, 20′, etc., all arranged and connected for operation in the same manner as previously described in connection with Fig. 1 of the drawing. Therefore, a detailed description of the circuit connections for the register and gate tubes 10, 20, etc., of Fig. 2 of the drawing will not be again made. In the arrangement of the invention shown by Fig. 2, however, the first register tube is indicated by 10″ and the application of the first voltage pulse to be registered and counted will cause register tube 10″ to become and remain conductive for indicating the occurrence of such first voltage pulse. In this form of the invention also, the gate tube 35 is designated as a prime gate tube and differs from the other gate tubes, such as 20, 20′ or 20″ by its circuit arrangement. It will be noted that the prime gate tube 35 is connected in series with the voltage appearing across terminals 14 and 15 and the switch 12 together with resistors 36 and 37. The values of resistors 36 and 37 and the firing characteristic of the prime gate tube 35 are so chosen that prime gate tube will become momentarily conductive upon the application across terminals 14 and 16 of the first voltage pulse to be counted and registered, assuming the voltage pulse to have the requisite polarity and pulse amplitude of at least fifteen volts and not more than fifty volts. Such voltage pulse to be counted and registered is coupled through the coupling capacitor 38 and applied across the prime gate 35, which therefore becomes momentarily conductive to apply another voltage pulse through coupling capacitor 39 across the electrodes of the first register tube 10″. As previously mentioned, the choice of the values of the circuit components affecting the first register diode 10″ is such that the sum total of applied voltage across the register tube 10″ when the first voltage pulse to be registered is received is greater than the firing voltage characteristic of the register tube 10″ causing such tube to become and remain conductive. Thus, the occurrence of the first voltage pulse to be registered and counted is indicated by the sustained conduction of the register tube 10″ which, in view of its conductive condition, increases the applied voltage across the next gate tube 20 so that such gate tube will become momentarily conductive upon the application of the next pulse to be registered and counted. Thereafter, the operation of the registering and counting circuit of Fig. 2 is exactly the same as previously described in connection with Fig. 1 of the drawing.

The following is a list of the typical component values which may be used to provide an operative arrangement according to Fig. 2 of the drawing:

Gas tube diodes 10, 10′ or 10″=NE–96
Gas tube diodes 20, 20′ or 20″=NE–2
Resistors 11, 11′ and 11″=110,000 ohms
Resistors 12, 12′ and 12″=470,000 ohms
Resistors 13, 13′ and 13″=3,300,000 ohms
Resistors 17, 17′ and 17″=120,000 ohms
Resistors 36 and 37=1,000,000 ohms
Capacitors 22, 23 and 24=.01 mf.
Capacitors 25, 26 and 27=.005 mf.
Capacitors 38 and 39=.001 mf.
Primate gate tube 35=type NE–96
Voltage applied across terminals 14 and 15=120 volts D.-C.
Maximum amplitude of voltage pulse to be registered =not less than 15 volts or more than 50 volts D.-C.

When it is desired to reset the pulse registering and counting circuits of the invention, it is only necessary to momentarily open switch 12 to remove the applied voltage for sustaining conduction through the register tubes thus causing those register tubes that were conducting to extinguish. With the register tubes extinguished, in the form of Fig. 1 of the invention, it is necessary to again momentarily close switch 19 in order to cause the prime tube 10″ to become conductive. However, in the form of the invention shown in Fig. 2 of the drawing, the first register tube 10″ will automatically become conductive upon the application of the first voltage pulse to be counted in view of the automatic operation of the priming circuit including the prime gate tube 35 and associated resistors 36, 37 and capacitors 38, 39.

While I have specifically described two embodiments of the invention, it should be obvious that various modifications may be made within the spirit of the invention and the scope of the appended claims.

What is claimed is:

1. Apparatus for registering a voltage pulse, comprising a register diode, a gate diode, a source of direct current, circuit means for applying direct current from said source across said register diode with a voltage amplitude less than the firing voltage amplitude characteristic and greater than the sustaining voltage amplitude characteristic of the register diode, circuit means for applying direct current from said source across said gate diode with a voltage amplitude less than the firing and sustaining voltage amplitude characteristics of the gate diode, means to apply to said gate diode the voltage pulse to be registered in a manner to momentarily raise the applied voltage across said gate diode to an amplitude greater than its firing voltage characteristic and cause said gate diode to become momentarily conductive for conducting said pulse, and means interconnecting the circuit means of said gate and register diodes to apply to said register diode a voltage pulse derived from the conduction of the pulse to be registered through said gate diode in a manner to momentarily raise the amplitude of applied voltage across said register diode to a value greater than its firing voltage characteristic to thereby fire said register diode which will thereafter remain conductive as an indication of a registered pulse.

2. A voltage pulse counting chain comprising a plurality of register diodes, a plurality of gate diodes, a source of direct current, circuit means for applying direct current from said source across each of said register diodes with a voltage amplitude less than the firing voltage amplitude characteristic and greater than the sustaining voltage amplitude characteristic of the respective register diode, circuit means for applying direct current from said source across each of said gate diodes with a voltage amplitude less than the firing and sustaining voltage amplitude characteristics of the respective gate diode, means to apply to each of said gate diodes the voltage pulse to be registered, means serially interconnecting the circuit means alternately of successive register diodes and gate diodes in a manner to raise the amplitude of applied voltage across each gate diode when the preceding register diode is conductive to thereby enable conduction through the gate diode when a pulse to be registered is applied thereto, and means serially interconnecting the circuit means alternately of successive gate diodes and register diodes for applying to the next successive register diode a voltage pulse derived from the conduction of the pulse to be registered through the next preceding gate diode in a manner to momentarily raise the amplitude of the applied voltage across said next succeeding register diode to a value greater than its firing voltage characteristic to thereby fire such register diode which will thereafter remain conductive as an indication of a registered pulse.

3. A voltage pulse counting chain comprising a plurality of register diodes, a plurality of gate diodes, a source of direct current, circuit means for applying direct current from said source across each of said register diodes with a voltage amplitude less than the firing voltage amplitude characteristic and greater than the sustaining voltage amplitude characteristic of the respective register diode, circuit means for applying direct current from said source across each of said gate diodes with a voltage amplitude less than the firing and sustaining voltage amplitude characteristics of the respective gate diode, means to apply to each of said gate diodes the voltage pulse to be registered, means serially interconnecting the circuit means alternately of successive register diodes and gate diodes in a manner to raise the amplitude of applied voltage across each gate diode when the preceding register diode is conductive to thereby enable conduction through the gate diode when a pulse to be registered is applied thereto, means to momentarily raise the applied voltage across the first of said register diodes to a value higher than its firing voltage characteristic to cause said diode to become and remain conductive as a prime register diode, and means serially interconnecting the circuit means alternately of successive gate diodes and register diodes for applying to the next successive register diode a voltage pulse derived from the conduction of a pulse to be registered through the next preceding gate diode in a manner to momentarily raise the amplitude of the applied voltage across said next succeeding register diode to a value greater than its firing voltage characteristic to thereby fire such register diode which will thereafter remain conductive as an indication of a registered pulse.

References Cited in the file of this patent

UNITED STATES PATENTS

| | | |
|---|---|---|
| 2,616,627 | Holden | Nov. 4, 1952 |
| 2,626,751 | Mullarkey | Jan. 27, 1953 |
| 2,709,771 | Dehn | May 31, 1955 |
| 2,719,250 | Six et al. | Sept. 27, 1955 |
| 2,730,655 | Geisler | Jan. 10, 1956 |
| 2,765,426 | Faulkner | Oct. 2, 1956 |

UNITED STATES PATENT OFFICE

CERTIFICATE OF CORRECTION

Patent No. 2,829,309 April 1, 1958

Howard L. Foote

It is hereby certified that error appears in the printed specification of the above numbered patent requiring correction and that the said Letters Patent should read as corrected below.

Column 1, line 52, for "member" read --number--; column 3, line 10, for "resistor" read --resistors--; column 4, lines 17, 18 and 19, for "Reistors" read --Resistors--; line 55, after "tube", second occurrence, insert --35--; column 5, line 22, for "Primate" read --Prime--.

Signed and sealed this 15th day of July 1958.

(SEAL)
Attest:
KARL H. AXLINE
Attesting Officer

ROBERT C. WATSON
Commissioner of Patents